(12) United States Patent
Ohbayashi et al.

(10) Patent No.: US 8,700,281 B2
(45) Date of Patent: Apr. 15, 2014

(54) VEHICLE INCLUDING A WHEEL STOPPING DETERMINATION UNIT

(75) Inventors: Motonari Ohbayashi, Susono (JP);
Ayako Nishimura, Gotemba (JP);
Masayuki Naito, Takahama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 91 days.

(21) Appl. No.: 13/001,489

(22) PCT Filed: May 27, 2009

(86) PCT No.: PCT/JP2009/059701
§ 371 (c)(1),
(2), (4) Date: Jan. 26, 2011

(87) PCT Pub. No.: WO2010/137136
PCT Pub. Date: Dec. 2, 2010

(65) Prior Publication Data
US 2011/0118948 A1      May 19, 2011

(51) Int. Cl.
*B60T 8/24*      (2006.01)
(52) U.S. Cl.
USPC ............... 701/70; 701/71; 701/78; 701/79; 303/121; 303/192
(58) Field of Classification Search
USPC ........................................................ 702/148
See application file for complete search history.

(56) References Cited

U.S. PATENT DOCUMENTS

| | | | | |
|---|---|---|---|---|
| 3,807,811 A | * | 4/1974 | Nakamura et al. | 303/171 |
| 4,270,176 A | * | 5/1981 | Skarvada | 702/148 |
| 4,420,814 A | * | 12/1983 | Arikawa et al. | 702/148 |
| 4,828,334 A | * | 5/1989 | Salman | 303/191 |
| 5,132,907 A | * | 7/1992 | Ishikawa | 701/74 |
| 5,566,094 A | * | 10/1996 | Kojima et al. | 702/87 |
| 5,612,879 A | * | 3/1997 | Makino | 701/70 |
| 5,960,377 A | * | 9/1999 | Hyde | 702/148 |

(Continued)

FOREIGN PATENT DOCUMENTS

| | | |
|---|---|---|
| JP | 62 017468 | 2/1987 |
| JP | 06 213670 | 8/1994 |

(Continued)

OTHER PUBLICATIONS

International Search Report issued Jul. 14, 2009 in PCT/JP09/059701 filed May 27, 2009.

(Continued)

*Primary Examiner* — Thomas Tarcza
*Assistant Examiner* — Richard Goldman
(74) *Attorney, Agent, or Firm* — Oblon, Spivak, McClelland, Maier & Neustadt, L.L.P.

(57) ABSTRACT

A vehicle that improves the accuracy of wheel stopping determination including a stopping determination unit that calculates stopping determination time by multiplying the pulse width of a wheel speed pulse immediately before a non-output time, for which no wheel speed pulse is output from a wheel speed sensor, by $2^{1/2}+1$, or a corrected time which is corrected on the basis of the stopping determination time is set as a threshold value for determining stopping of wheels. Thus, the time corresponding to the pulse width of the wheel speed pulse takes into consideration the deceleration and traveling distance of the vehicle, thereby obtaining an optimum threshold value for determining the stopping of the wheels.

4 Claims, 6 Drawing Sheets

(56) References Cited

U.S. PATENT DOCUMENTS

| | | | |
|---|---|---|---|
| 6,135,576 A * | 10/2000 | Batistic | 303/113.5 |
| 6,223,135 B1 * | 4/2001 | Muller | 702/148 |
| 6,226,591 B1 | 5/2001 | Okumura et al. | |
| 6,230,110 B1 * | 5/2001 | Iwazaki | 702/148 |
| 6,371,250 B1 * | 4/2002 | Bunker | 188/18 A |
| 6,783,194 B2 * | 8/2004 | Arnold | 303/139 |
| 6,829,525 B2 * | 12/2004 | Tanaka et al. | 701/1 |
| 7,031,874 B2 * | 4/2006 | Tsuruhara et al. | 702/148 |
| 7,058,537 B2 * | 6/2006 | Sutter et al. | 702/150 |
| 7,421,334 B2 * | 9/2008 | Dahlgren et al. | 701/117 |
| 8,121,756 B2 * | 2/2012 | Giers et al. | 701/37 |
| 8,209,081 B2 * | 6/2012 | Joyce | 701/33.1 |
| 2002/0135229 A1 * | 9/2002 | Ohtsu | 303/156 |
| 2003/0236607 A1 | 12/2003 | Tanaka et al. | |
| 2004/0122616 A1 * | 6/2004 | Kumar et al. | 702/148 |
| 2004/0267493 A1 * | 12/2004 | Pinard et al. | 702/145 |
| 2006/0241892 A1 * | 10/2006 | Gustavsson | 702/148 |
| 2009/0093993 A1 * | 4/2009 | Maitlen | 702/148 |
| 2012/0051492 A1 * | 3/2012 | Grose et al. | 377/20 |

FOREIGN PATENT DOCUMENTS

| | | |
|---|---|---|
| JP | 7 139617 | 5/1995 |
| JP | 2000 097713 | 4/2000 |
| JP | 2003 322533 | 11/2003 |
| JP | 2008 094143 | 4/2008 |

OTHER PUBLICATIONS

International Preliminary Report on Patentability and Written Opinion issued Dec. 22, 2011 in patent application No. PCT/JP2009/059701.

* cited by examiner

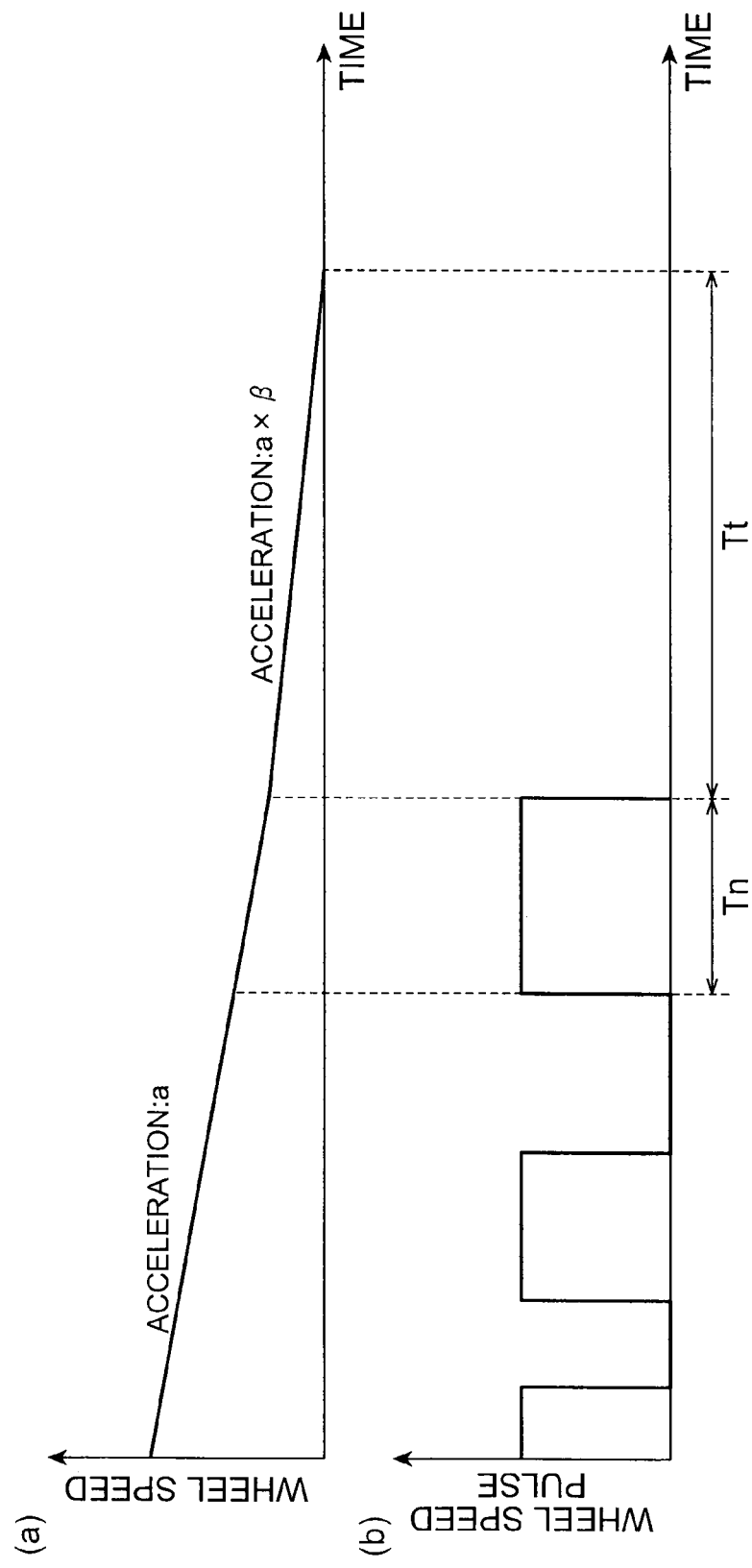

VEHICLE INCLUDING A WHEEL STOPPING DETERMINATION UNIT

TECHNICAL FIELD

The present invention relates to a vehicle.

BACKGROUND ART

In the related art, a device is known which determines whether the vehicle is in a stopping state or not on the basis of a pulse signal output from a wheel speed sensor (for example, see Patent Document 1). The device described in Patent Document 1 determines a stopping-beginning-reaching time for the vehicle to stop on the basis of the cycle of a pulse signal output from the wheel speed sensor and the presence/absence of the pulse signal. When the stopping-beginning-reaching time has elapsed with no pulse signal output from the wheel speed sensor for the stopping-beginning-reaching time, it is determined that the vehicle is in the stopping state.

Patent Document 1: Japanese Unexamined Patent Application Publication No. H06-213670

SUMMARY OF INVENTION

Problems to be Solved by the Invention

The stopping of the wheels (vehicle) may be used in triggering or the like, for example, subsequent vehicle control, such as stopping maintenance control. For this reason, in the determination of the stopping of the wheels as described in the above document, there is a demand for improving determination accuracy and for implementing an optimum mode.

The invention has been finalized in order to solve the above-described problem, and an object of the invention is to provide a vehicle capable of improving the accuracy of wheel stopping determination.

Means for Solving the Problems

In order to solve the above-described problem, a vehicle according to the invention includes a wheel speed sensor which outputs a wheel speed pulse in accordance with the rotation of wheels, and a wheel stopping determination unit which determines whether the rotation of the wheels is stopped or not on the basis of the wheel speed pulse output from the wheel speed sensor. When a non-output time for which no wheel speed pulse is output from the wheel speed sensor is equal to or longer than a stopping determination time which is calculated by multiplying a time corresponding to the pulse width of a wheel speed pulse output from the wheel speed sensor before the non-output time by $2^{1/2}+1$, or a corrected time which is corrected on the basis of the stopping determination time, the wheel stopping determination unit determines that the rotation of the wheels is stopped.

In this vehicle, the stopping determination time which is calculated by multiplying the pulse width of a wheel speed pulse before the non-output time for which no wheel speed pulse is output from the wheel speed sensor, for example, the wheel speed pulse immediately before the non-output time, by $2^{1/2}+1$, or the corrected time which is corrected on the basis of the stopping determination time is set as a threshold value for determining the stopping of the wheels. For example, the wheel speed pulse which is output immediately before the non-output time is output when the wheels are substantially in the stopping state. Thus, the time corresponding to the pulse width of the wheel speed pulse is multiplied by $2^{1/2}+1$ which is a constant taking into consideration the deceleration and traveling distance of the vehicle, thereby obtaining an optimum threshold value for determining the stopping of the wheels. For this reason, it is determined whether the wheels are stopped or not on the basis of the stopping determination time or the corrected time, such that the stopping of the wheels can be determined rapidly and accurately. Therefore, it becomes possible to improve the accuracy of wheel stopping determination.

In order to solve the above-described problem, a vehicle according to the invention includes a wheel speed sensor which outputs a wheel speed pulse in accordance with the rotation of wheels, a wheel stopping determination unit which determines whether the rotation of the wheels is stopped or not on the basis of the wheel speed pulse output from the wheel speed sensor, and a vehicle control unit which performs vehicle control after the wheel stopping determination unit has determined that the rotation of the wheels is stopped. When a non-output time for which no wheel speed pulse is output from the wheel speed sensor is equal to or longer than a stopping determination time which is calculated by multiplying a time corresponding to the pulse width of a wheel speed pulse output from the wheel speed sensor before the non-output time by $2^{1/2}+1$, or a corrected time which is corrected on the basis of the stopping determination time, the wheel stopping determination unit determines that the rotation of the wheels is stopped.

In this vehicle, the stopping determination time which is calculated by multiplying the pulse width of the wheel speed pulse output before the non-output time for which no wheel speed pulse is output from the wheel speed sensor, for example, the wheel speed pulse immediately before the non-output time, by $2^{1/2}+1$, or the corrected time which is corrected on the basis of the stopping determination time is set as a threshold value for determining the stopping of the wheels. For example, the wheel speed pulse which is output immediately before the non-output time is output when the wheels are substantially in the stopping state. Thus, the time corresponding to the pulse width of the wheel speed pulse is multiplied by the constant $2^{1/2}+1$ taking into consideration the acceleration of the vehicle, thereby obtaining an optimum threshold value for determining the stopping of the wheels. For this reason, it is determined whether the wheels are stopped or not on the basis of the stopping determination time or the corrected time, such that the stopping of the wheels can be determined rapidly and accurately. Therefore, it becomes possible to improve the accuracy of wheel stopping determination. Vehicle control is performed after the stopping of the wheels has been determined in the above-described manner, making it possible to performing vehicle control with an appropriate timing.

The vehicle may further include a vehicle stopping determination unit which, when the wheel stopping determination unit determines that at least one wheel is stopped, determines whether the vehicle is stopped or not on the basis of whether or not the behavior of the vehicle is stable. In general, a driver tends to notice the stopping of the vehicle when a change in the behavior of the vehicle with a front-down inclination (a rear-up inclination) at the time of deceleration of the vehicle, a so-called nose dive, has settled. For this reason, in a state where the nose dive has not settled, when it is determined on the basis of the stopping of the wheels that the vehicle is stopped, the driver may feel discomfort. Thus, after it has been determined that the wheels are stopped, when the behavior of the vehicle is stable (the nose dive has settled), it is determined that the vehicle is stopped, thereby matching the stopping of the vehicle with the driver's sensation.

The corrected time is a time which is obtained by adding a change rate of the driving force or braking force of the vehicle to the stopping determination time. In this case, the corrected time is calculated in accordance with changes in the driving force and braking force of the vehicle, making it possible to determine the stopping of the vehicle depending on changes in the state of the vehicle. Therefore, it is possible to more reliably determine whether or not the wheels are stopped.

The corrected time is a time which is obtained by adding a change rate of force applied to tires calculated on the basis of the driving force and braking force of the vehicle to the stopping determination time. In this case, the corrected time is calculated in accordance with the change rate of force applied to the tires, making it possible to determine the stopping of the wheels depending on changes in the states of the tires. Therefore, it is possible to more reliably determine whether or not the wheels are stopped.

The time corresponding to the pulse width may be a time from the rising edge to the falling edge in the wheel speed pulse or a time from the falling edge of the wheel speed pulse to the rising edge in the wheel speed pulse.

Effect of the Invention

According to the invention, it is possible to improve the accuracy of wheel stopping determination.

BRIEF DESCRIPTION OF DRAWINGS

FIG. 6 is a time chart showing a flow in a vehicle according to a modification until wheels are stopped.

BEST MODES FOR CARRYING OUT THE INVENTION

Hereinafter, a preferred embodiment of a vehicle according to the invention will be described in detail with reference to the drawings.

Figure 1:
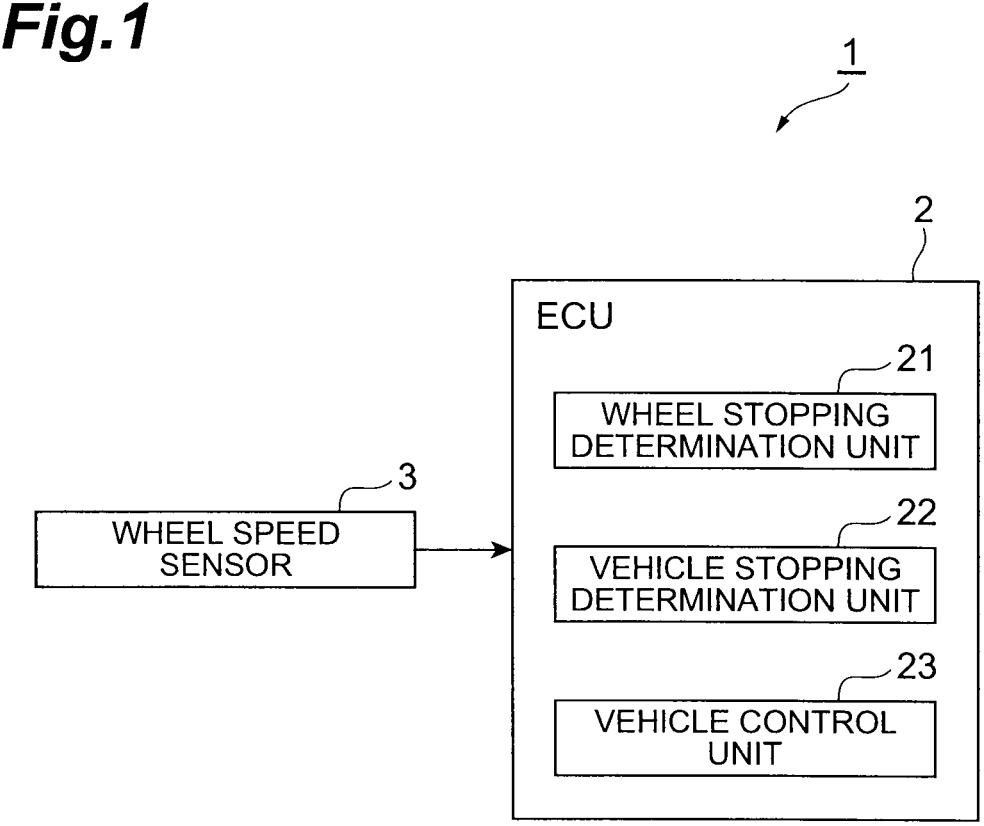
FIG. 1 is a block configuration diagram showing an embodiment of a vehicle according to the invention.

FIG. 1 is a block configuration diagram showing an embodiment of a vehicle according to the invention. As shown in FIG. 1, a vehicle 1 includes an ECU (Electronic Control Unit) 2. A wheel speed sensor 3 is connected to the ECU 2. The vehicle 1 is configured such that vehicle control is performed after it has been determined that wheels are stopped.

The wheel speed sensor 3 is a sensor which detects a wheel speed, and outputs a wheel speed pulse. The wheel speed sensor 3 is provided in each wheel of the vehicle 1 and detects a change in a magnetic flux of a portion of the speed sensor 3 according to the rotation of the wheel to detect the rotation of the wheel. The wheel speed sensor 3 outputs a wheel speed pulse according to the rotation of the wheel to the ECU 2.

The ECU 2 has a wheel stopping determination unit 21, a vehicle stopping determination unit 22, and a vehicle control unit 23. The ECU 2 performs overall control of the device provided in the vehicle 1, and is constituted by, for example, a computer including a CPU, a ROM, a RAM, and the like.

The wheel stopping determination unit 21 determines whether or not the wheel is stopped. When receiving a wheel speed pulse output from the wheel speed sensor 3, the wheel stopping determination unit 21 determines whether the corresponding wheel is stopped or not on the basis of the wheel speed pulse. Specifically, when a non-output time for which no wheel speed pulse is output from the wheel speed sensor 3 is equal to or longer than a stopping determination time or a corrected time, the wheel stopping determination unit 21 determines that the wheel is stopped. The stopping determination time and the corrected time will be described below in detail.

Figure 2:
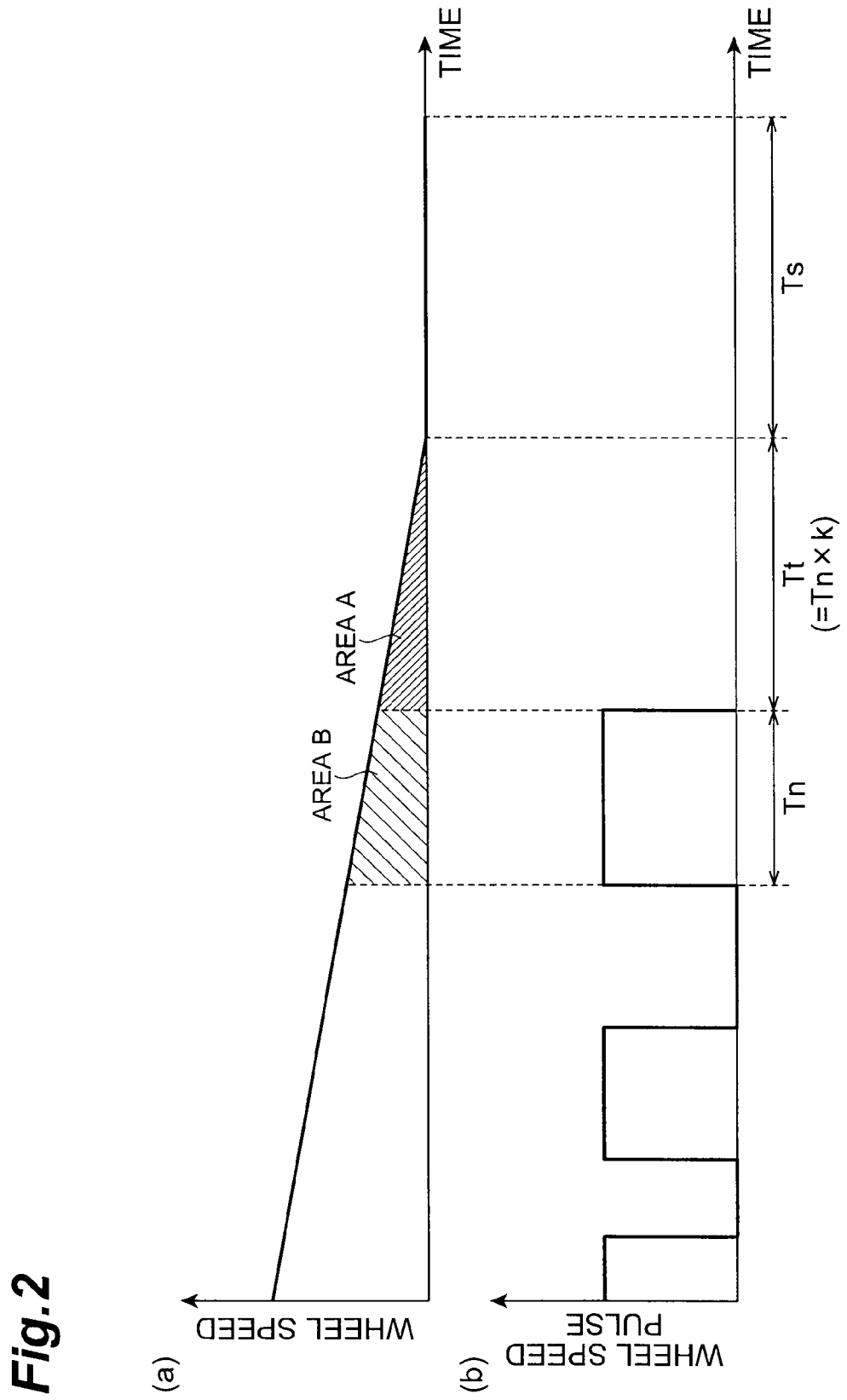
FIG. 2 is a time chart showing a flow in a vehicle until the vehicle is stopped.

FIG. 2 is a time chart showing a flow in the vehicle 1 until the vehicle is stopped. FIG. 2(a) shows a change in a wheel speed and FIG. 2(b) shows an output of a wheel speed pulse. As shown in FIG. 2, the above-described stopping determination time $T_t$ is a time which is calculated by multiplying a time $T_n$ corresponding to the pulse width of a wheel speed pulse output from the wheel speed sensor 3 immediately before the non-output time, for which no wheel speed pulse is output, by a constant K, $2^{1/2}+1$. The wheel speed pulse which is used in calculating the stopping determination time $T_t$ may be output from the wheel speed sensor 3 before the non-output time, for example, may be a wheel speed pulse output immediately before the wheel speed pulse is output (before the non-output time is reached), the average of output wheel speed pulses, or the like. The time $T_n$ corresponding to the pulse width is a time from the rising edge to the falling edge in the wheel speed pulse or a time from the falling edge to the rising edge in the wheel speed pulse.

The constant K will be described with reference to FIG. 2. In the following description, since the output interval of the wheel speed pulse is very short, the deceleration of the vehicle 1 is uniform until the wheel is stopped. As shown in FIG. 2, the wheel speed is uniform from the rising edge (or falling edge) of the wheel speed pulse before the non-output time until the wheel is stopped. The time corresponding to the pulse width of the wheel speed pulse output from the wheel speed sensor 3 immediately before the non-output time is $T_n$, and the stopping determination time $T_t$ for determining the stopping of the wheel of the vehicle 1 is calculated by $T_n \times K$. In FIG. 2(a), the areas A and B of the hatched regions indicate a traveling distance from the relationship between time and speed. The traveling distance interval of the vehicle corresponding to the wheel speed pulse is uniform. Thus, the areas A and B are the same (area A=area B) and expressed by Expression (1).

[Equation 1]

$$\int_0^{Tn \times K} at \cdot dt = \int_{Tn \times K}^{Tn \times K + Tn} at \cdot dt \quad (1)$$

In Expression (1), a represents a deceleration (uniform), and t represents time. From Expression (1), the constant $K=2^{1/2}+1$ is calculated.

Figure 3:
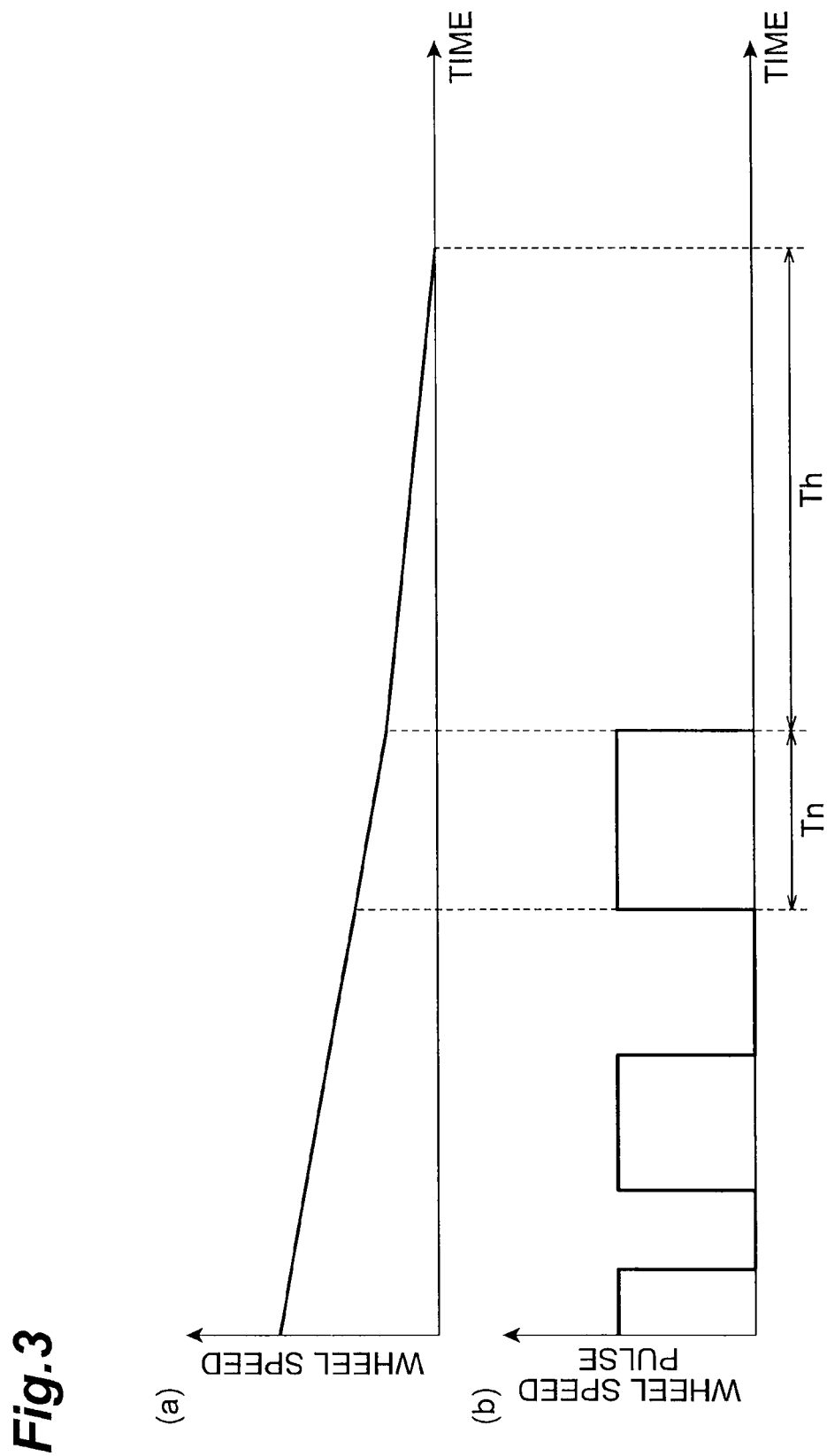
FIG. 3 is a time chart showing a flow in a vehicle until wheels are stopped.

FIG. 3 is a time chart showing a flow in the vehicle 1 until the wheel is stopped. FIG. 3(a) shows a change in a wheel speed and FIG. 3(b) shows an output of a wheel speed pulse. As shown in FIG. 3, the above-described corrected time $T_h$ may be a time which is corrected on the basis of the stopping determination time $T_t$ when a deceleration is changed due to variations in torque of the vehicle 1. Specifically, the corrected time $T_h$ is a time which is obtained by dividing the stopping determination time $T_t$ by a change rate of a torque of a tire calculated on the basis of driving force and braking force when torque applied to the tire is changed from when a wheel speed pulse immediately before the non-output time is input, a time in which the history of changes in torque applied to the tire is reflected in the stopping determination time $T_t$, a time in which a change rate of braking force at the time of wheel stopping is reflected in the stopping determination time $T_t$, or a time in which a change rate of driving force at the time of wheel stopping is reflected in the stopping determination time.

When it is determined that the wheel is stopped, the wheel stopping determination unit 21 outputs wheel stopping information indicating the stopping of the wheel to the vehicle stopping determination unit 22 and the vehicle control unit 23. The wheel stopping information is generated and output for each wheel.

Returning to FIG. 1, the vehicle stopping determination unit 22 determines whether or not the vehicle 1 is stopped. When it is determined that at least one wheel (in this embodiment, three wheels) is stopped, the vehicle stopping determination unit determines the stopping of the vehicle 1 on the basis of whether or not the behavior of the vehicle 1 is stable. The behavior of the vehicle 1 refers to a nose dive which is a change in the behavior of the vehicle 1 with a front-down inclination (a rear-up inclination) at the time of deceleration of the vehicle 1. Thus, the state where the behavior of the vehicle 1 is stable refers to a state where a nose dive has settled. When the wheel stopping information output from the wheel stopping determination unit 21 is received and when it is determined that a predetermined time has elapsed after the wheel stopping information has been received, the vehicle stopping determination unit 22 determines that the vehicle 1 is stopped.

The time at which the nose dive has settled is determined by the vehicle to some extent. For this reason, the predetermined time is calculated on the basis of a prescribed value set in advance on the basis of the specification of the vehicle 1 and the deceleration of the vehicle 1. As shown in FIG. 2, when the predetermined time $T_s$ has elapsed after the wheel stopping information has been received, the vehicle stopping determination unit 22 determines that the behavior of the vehicle 1 is stable and then determines that the vehicle 1 is stopped. When it is determined that the vehicle 1 is stopped, the vehicle stopping determination unit 22 outputs vehicle stopping information indicating the stopping of the vehicle 1 to the vehicle control unit 23. When an electric suspension (air suspension, electromagnetic suspension, or the like) is attached to the vehicle 1, the vehicle stopping determination unit 22 appropriately changes the predetermined time $T_s$ in accordance with the operation state of the electric suspension.

The vehicle control unit 23 performs various kinds of control of the vehicle 1. When receiving the wheel stopping information output from the wheel stopping determination unit 21, the vehicle control unit 23 executes stopping maintenance control such that the vehicle 1 is maintained while in the stopping state. Specifically, the vehicle control unit 23 operates a pressurization mechanism, which pressurizes the pressure of the wheel cylinder (W/C), during a nose dive so as to execute the stopping maintenance control. When receiving the vehicle stopping information output from the vehicle stopping determination unit 22, the vehicle control unit 23 turns on an indicator which indicates the execution state of the stopping maintenance control. That is, the indicator is turned on after the nose dive of the vehicle 1 has settled.

When a predetermined acceleration operation is made by the driver in a state where vehicle stopping maintenance is executed, the vehicle control unit 23 releases the stopping maintenance control and turns off the indicator. Of course, the vehicle control which is executed by the vehicle control unit 23 is not limited to the stopping maintenance control, and control, such as N (neutral) control, eco-running control, HV (hybrid) creep cut control, slope creep increase control, or ascending slope starting auxiliary control, may be performed.

Figure 4:
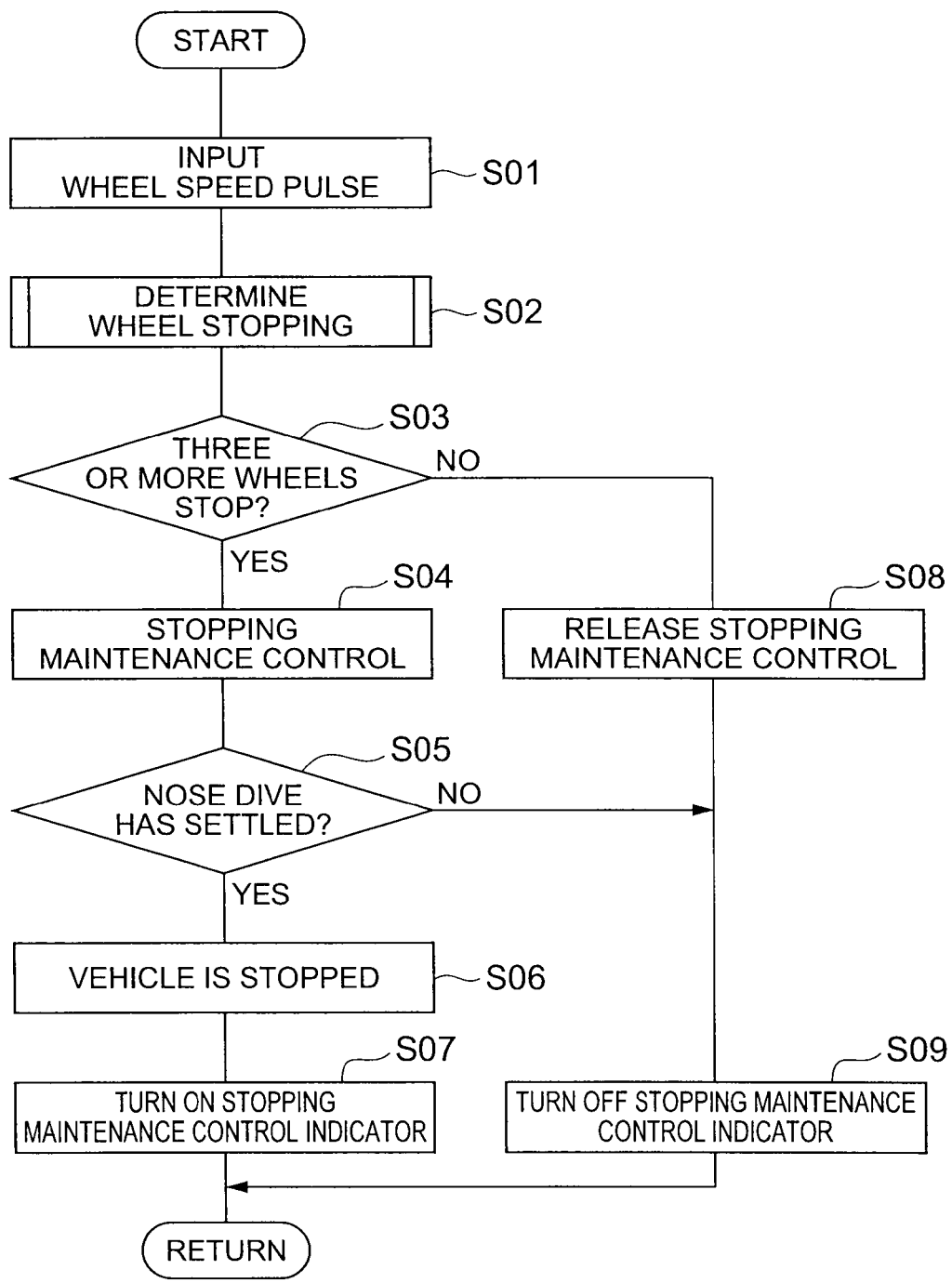
FIG. 4 is a flowchart showing the details of a processing procedure of an operation which is executed by an ECU.
Figure 5:
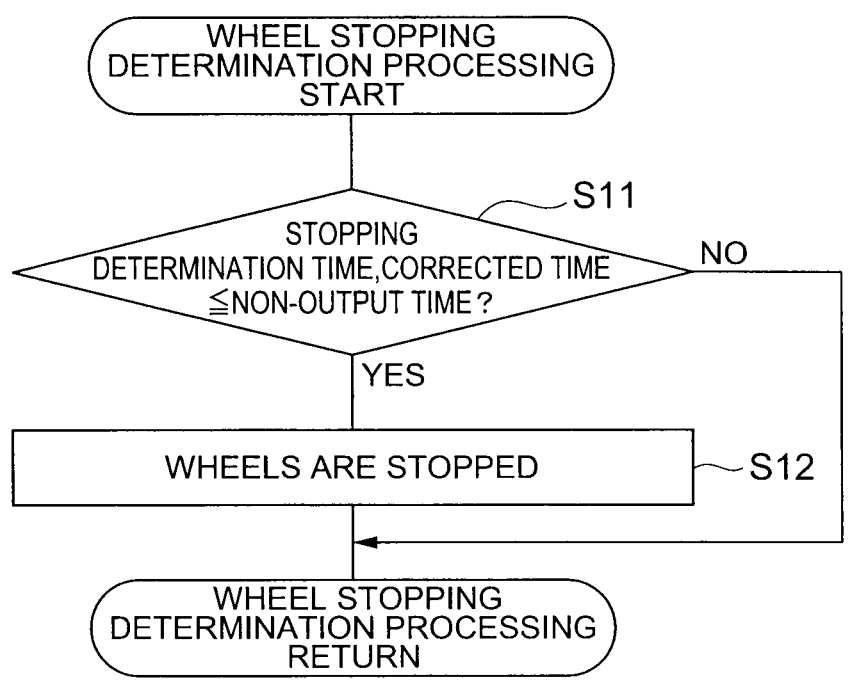
FIG. 5 is a flowchart showing wheel stopping determination processing.

Subsequently, the above-described determination on the stopping of the vehicle 1 will be described with reference to FIGS. 4 and 5. FIG. 4 is a flowchart showing the details of a processing procedure of an operation which is executed by the ECU 2. FIG. 5 is a flowchart showing wheel stopping determination processing.

As shown in FIG. 4, first, the wheel speed pulse according to the rotation of the wheel detected by the wheel speed sensor 3 is input to the wheel stopping determination unit 21 (Step S01). Next, the wheel stopping determination unit 21 executes wheel stopping determination processing on the basis of the wheel speed pulse input from the wheel speed sensor 3 (Step S02). The wheel stopping determination processing will be described with reference to FIG. 5.

As shown in FIG. 5, if the wheel stopping determination processing starts, first, it is determined whether or not the non-output time for which no wheel speed pulse is output is equal to or longer than the stopping determination time $T_t$ which is calculated on the basis of the time corresponding to the pulse width of the wheel speed pulse output immediately before the non-output time or the corrected time $T_h$ which is corrected on the basis of the stopping determination time (Step S11). When it is determined that the non-output time is equal to or longer than the stopping determination time $T_n$ or the corrected time $T_h$, it is determined that the wheel is stopped (Step S12). Meanwhile, when it is determined that the non-output time is not equal to or longer than the stopping determination time $T_n$ or the corrected time $T_h$, the processing ends. In this way, the wheel stopping determination processing is executed.

Returning to FIG. 4, the vehicle stopping determination unit 22 determines whether three or more wheels are stopped or not on the basis of the determination result of the wheel stopping determination processing (Step S03). When it is determined that three or more wheels are stopped, the processing progresses to Step S04. Meanwhile, when it is determined that three or more wheels are not stopped, the processing progresses to Step S08.

In Step S04, the vehicle control unit 23 performs the stopping maintenance control. After the stopping maintenance control is performed, the vehicle stopping determination unit 22 determines whether or not the nose dive of the vehicle 1 has settled (Step S05). When it is determined that the nose dive has settled, it is determined that the vehicle 1 is stopped (Step S06), and the vehicle control unit 23 turns on the indicator which indicates the execution state of the stopping maintenance control (Step S07). Meanwhile, when it is determined that the nose dive has not settled, the processing progresses to Step S09.

In Step S08, the vehicle control unit 23 releases (resets) the stopping maintenance control. The indicator which indicates the execution state of the stopping maintenance control is turned off (Step S09).

As described above, in the vehicle 1 of this embodiment, the stopping determination time $T_t$ which is calculated by multiplying the pulse width of the wheel speed pulse immediately before the non-output time, for which no wheel speed pulse is output from the wheel speed sensor 3, by $2^{1/2}+1$, or the corrected time $T_h$ which is corrected on the basis of the stopping determination time $T_t$ is used as the threshold value for determining of the stopping of the wheels. The wheel speed pulse which is output immediately before the non-output time is output when the wheels are substantially in the stopping state. Thus, the time corresponding to the pulse width of the wheel speed pulse is multiplied by $2^{1/2}+1$ which is the constant K taking into consideration the deceleration and traveling distance of the vehicle 1, obtaining the optimum threshold value for determining the stopping of the wheels. For this reason, the stopping of wheels is determined on the basis of the stopping determination time $T_t$ or the corrected time $T_h$, such that the stopping of the wheels can be determined rapidly and accurately. Therefore, it becomes possible to improve the accuracy of wheel stopping determination.

In the vehicle 1 of this embodiment, after the stopping of the wheels is determined and before the nose dive has settled (during the nose dive), the vehicle control unit 23 executes the stopping maintenance control. Thus, operating sound of the pressurization mechanism, vibration, or the like is not easily transferred to the driver compared to a case where the pressurization mechanism is operated to pressurize the wheel cylinder pressure after the vehicle 1 is completely stopped. For this reason, it is possible to reduce the drivers' discomfort.

When the wheel stopping determination unit 21 determines that the wheels are stopped, the vehicle stopping determination unit 22 determines whether the vehicle 1 is stopped or not on the basis of whether the nose dive of the vehicle 1 has settled. In general, the driver tends to notice the stopping of the vehicle 1 when a change in the behavior of the vehicle 1 with a front-down inclination (a rear-up inclination) at the time of deceleration of the vehicle 1, a so-called nose dive, has settled. For this reason, in a state where the nose dive has not settled, when it is determined on the basis of the stopping of the wheels that the vehicle 1 is stopped, the driver may feel discomfort. Thus, after it is determined that the wheels are stopped, when the nose dive of the vehicle 1 has settled, it is determined that the vehicle 1 is stopped, thereby matching the stopping of the vehicle 1 with the driver's sensation.

The corrected time $T_h$ is the time which is obtained by adding the change rate of the driving force or braking force of the vehicle 1 to the stopping determination time $T_n$ or the time which is obtained by adding the change rate of force applied to the tire calculated on the basis of the driving force and braking force of the vehicle 1 to the stopping determination time. Thus, it is possible to determine the stopping of the wheels according to changes in the state of the vehicle 1. Therefore, it is possible to more reliably determine whether the wheels are stopped.

The invention is not limited to the above-described embodiment. For example, although in the above-described embodiment, the constant K is set with the uniform deceleration of the vehicle 1, the constant K may be set in accordance with changes in the deceleration until the vehicle 1 is stopped. As shown in FIG. 6, if the deceleration when no wheel speed pulse is output is changed from a to a×β (where 0<β≤1), the constant K is calculated as follows.

[Equation 2]

$$\int_0^{Tn \times K} a\beta t \cdot dt = \int_{Tn \times K}^{Tn \times K + Tn} at \cdot dt \quad (2)$$

From Expression (2), the following expression is obtained.

[Equation 3]

$$K = \frac{2 \pm \sqrt{4+4\beta}}{2\beta} = \frac{1 \pm \sqrt{1+\beta}}{\beta} \quad (3)$$

The constant K satisfies the condition K>0, thus the following expression is obtained.

[Equation 4]

$$K = \frac{1 \pm \sqrt{1+\beta}}{\beta} \quad (4)$$

If the stopping determination time $T_t$ is calculated on the basis of the constant K calculated as described above, even when the deceleration of the vehicle 1 is changed, it is possible to accurately determine the stopping of the vehicle 1.

In addition to the above-described embodiment, the corrected time $T_h$ may be a time ($T_h=T_t+\alpha$) which is calculated by adding α, which is calculated on the basis of the factor, such as changes in the behavior of the vehicle 1, to the stopping determination time $T_t$.

Although in the above-described embodiment, the vehicle stopping determination unit 22 determines whether the vehicle 1 is stopped or not on the basis of the predetermined time $T_s$, instead of this method, it may be determined whether the behavior of the vehicle 1 is stable or not on the basis of the behavior of the vehicle 1 detected by behavior detection means (for example, a G sensor, a height sensor, or the like), thereby determining whether or not the vehicle 1 is stopped.

INDUSTRIAL APPLICABILITY

In the vehicle according to the invention, the stopping of the wheels is determined on the basis of whether or not the non-output time for which no wheel speed pulse is output is equal to or longer than the stopping determination time which is calculated by multiplying the time corresponding to the pulse width of the wheel speed pulse output before the non-output time by $2^{1/2}+1$ or the corrected time which is corrected on the basis of the stopping determination time. Therefore, it is possible to improve the accuracy of wheel stopping determination.

DESCRIPTION OF THE SYMBOLS

1: vehicle, 2: ECU, 3: wheel speed sensor, 21: wheel stopping determination unit, 22: vehicle stopping determination unit, 23: vehicle control unit, $T_n$: time corresponding to pulse width, $T_t$: stopping determination time, $T_h$: corrected time.

The invention claimed is:
1. A vehicle comprising:
a wheel speed sensor which outputs a wheel speed pulse in accordance with the rotation of wheels;
a wheel stopping determination unit which determines whether the rotation of the wheels is stopped or not on the basis of the wheel speed pulse output from the wheel speed sensor;
a vehicle stopping determination unit which, when the wheel stopping determination unit determines that at least one wheel is stopped, determines whether the vehicle is stopped or not on the basis of whether or not the behavior of the vehicle is stable; and
a vehicle control unit which performs vehicle control after the wheel stopping determination unit has determined that the rotation of the wheels is stopped,
wherein, when a non-output time for which no wheel speed pulse is output from the wheel speed sensor is equal to or longer than a stopping determination time which is calculated by multiplying a time corresponding to the pulse width of a wheel speed pulse output from the wheel speed sensor before the non-output time by $2^{1/2}+1$ which is set taking into consideration the deceleration and traveling distance of the vehicle or equal to or longer than a corrected time which is based on the stopping determination time, the wheel stopping determination unit determines that the rotation of the wheels is stopped, when it is determined that a predetermined time has elapsed after the wheel stopping information indicating the stopping of the wheel has been received from the wheel stopping determination unit, the wheel stopping determination unit determines that a nose dive which is a change in the behavior of the vehicle with a front-down inclination at the time of deceleration of the vehicle has settled and determines that the vehicle is stopped, and when receiving the wheel stopping information from the wheel stopping determination unit the vehicle control unit executes stopping maintenance control such that the vehicle is maintained in the stopping state during the nose dive.

2. The vehicle according to claim 1, wherein the corrected time is a time which is obtained by adding a time related to a change rate of force applied to tires calculated on the basis of the driving force and braking force of the vehicle to the stopping determination time.

3. The vehicle according to claim 1, wherein the time corresponding to the pulse width is a time from the rising edge to the falling edge in the wheel speed pulse or a time from the falling edge to the rising edge in the wheel speed pulse.

4. The vehicle according to claim 1, wherein the corrected time is a time which is obtained by adding a time related to a change rate of the driving force or braking force of the vehicle to the stopping determination time.

* * * * *